June 28, 1938.   F. J. WOLFF   2,121,940
CLOSET BOWL
Filed Dec. 7, 1936   2 Sheets-Sheet 1
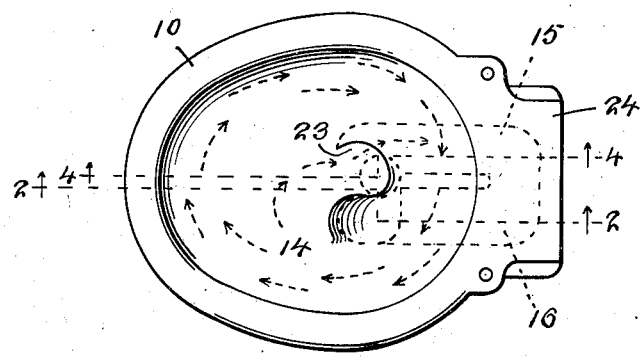
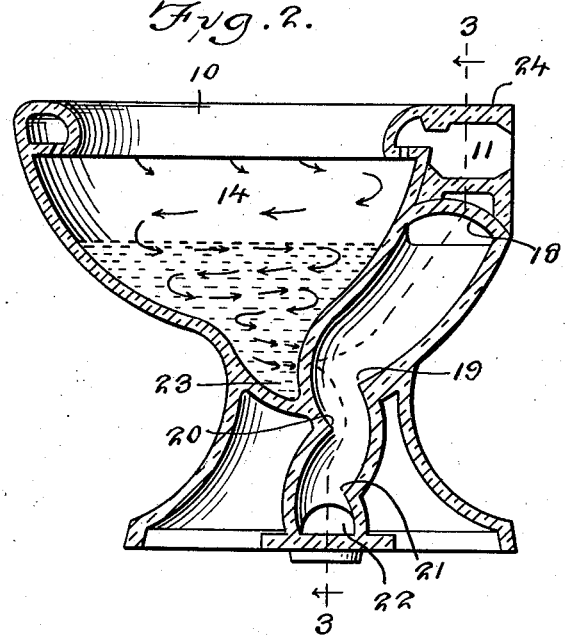
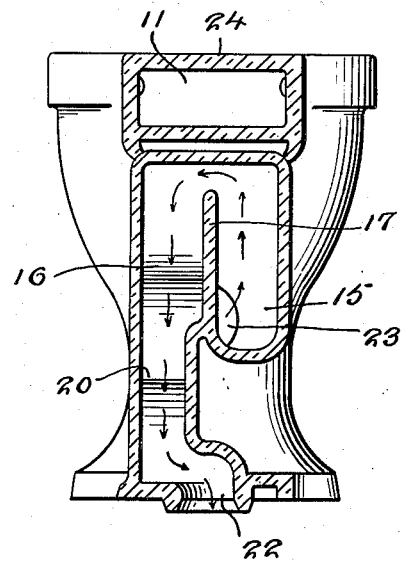
Franklyn J. Wolff
INVENTOR
BY
ATTORNEY June 28, 1938.  F. J. WOLFF  2,121,940
CLOSET BOWL
Filed Dec. 7, 1936  2 Sheets-Sheet 2
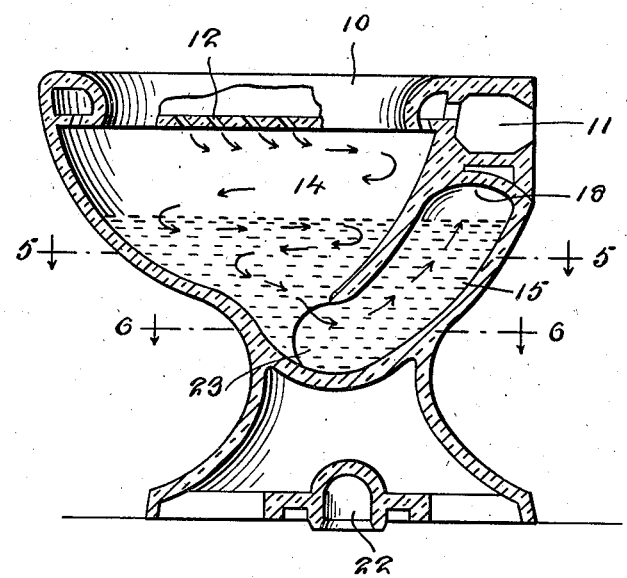
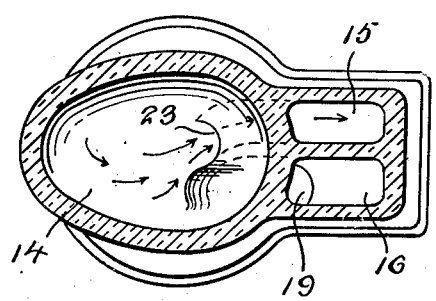 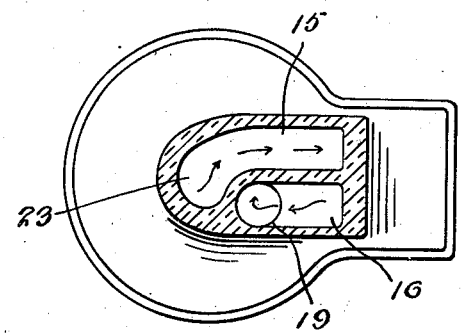
Franklyn J. Wolff
INVENTOR Patented June 28, 1938

2,121,940

UNITED STATES PATENT OFFICE 2,121,940

CLOSET BOWL

Franklyn J. Wolff, Trenton, N. J.

Application December 7, 1936, Serial No. 114,675

3 Claims. (Cl. 4—69)

The object of the invention is to provide a closet bowl of the siphon type involving as a principle of operation the production of an efficient and forcibly cleansing circulatory or gyratory flow of flushing water through the bowl under such conditions as to be conveyed to and maintained within and throughout the length of the siphon to thoroughly close the sides of both the bowl and siphon; to provide a construction whereby the necessity for a jet to start, or to assist in starting, the siphonic action may be avoided; to provide an arrangement whereby the amount of water necessary for an effective seal, and hence required to be moved in order to institute siphonic action, is minimized in the interest of economy without sacrificing efficiency; to provide for ready accessibility of the walls of compartments and passages for inspection in testing to discover possible flaws in the molded product; and to simplify the construction, particularly as to the number and character of the members applied to the main body of the bowl, after the molding of the latter and combining therewith to form the finished product.

Further objects and advantages of the invention appear in the course of the following description, it being understood that changes in form, proportions and details may be resorted to within the scope of the appended claims, without departing from the spirit of the invention.

In the drawings:

Figure 1 is a plan view of a closet bowl constructed in accordance with the invention.

Figure 2 is a vertical longitudinal sectional view of the same taken on the plane indicated by the line 2—2 of Figure 1.

Figure 3 is a vertical transverse sectional view taken on the plane indicated by the line 3—3 of Figure 2.

Figure 4 is a longitudinal sectional view taken on the plane indicated by the line 4—4 of Figure 1.

Figure 5 is a horizontal sectional view on the plane indicated by the line 5—5 of Figure 4.

Figure 6 is a similar view taken on the plane indicated by the line 6—6 of Figure 4.

In the illustrated and preferred embodiment of the invention a rim flush, only, is employed, the rim 10 being in communication with a supply chamber or inlet 11 and provided with jets 12 which are inclined or disposed obliquely, in a common direction, to cause a circulatory or gyratory or whirling motion, as indicated by the arrows, see particularly Figures 1, 2 and 4.

Leading from the lowermost point of the bowl 14 is the up-leg 15 of the siphon which has a communicating down-leg 16 separated from the up-leg by a partition 17 terminating short of the crown 18. Within the down-leg there is arranged a series of breaks 19, 20, 21 which serve to alternately deflect the passing contents in opposite directions on the way to the point of discharge at 22.

It is obvious that the circulatory motion imparted to the water in the bowl will serve to dislodge and reduce solid contents to a state of suspension, and in order to maintain this condition to the end that a thorough discharge of contents may be effected, the outlet 23 from the bowl to the up-leg of the siphon is arranged in the path of moving water, receiving the same without destroying the vortex which is thus maintained and prolonged within and throughout the length of both the up and down legs of the siphon, as has been adequately and conclusively proved by practical demonstration.

It will be noted from the foregoing description that the direction of discharge from the flushing rim, in connection with the downwardly tapered or essentially conical form of the bowl produces a circulatory or gyratory action of the water which involves formation of a vortex, and the outlet from the bowl, which constitutes the inlet or entrance opening to the up-leg of the siphon is disposed in the path of moving water and at substantially right angles thereto whereby a head pressure is produced in the up-leg of the siphon which with the gyratory movement of the water entering it not only empties the bowl of its contents but operates to cleanse the siphon as well. By reason of having the effect of maintaining solid particles in suspension and preventing the deposit of the same upon or their adherence to the walls of the passages on the way to the outlet 22.

It will be noted moreover that after the construction of the body portion of the bowl, and prior to the application thereto of the rim, an unobstructed view of the walls of the passages, and particularly those forming the siphon, is afforded, in connection with the tests which are usually made with reference to devices of this type as a means of discovering any flaws in the castings.

Moreover, both legs of the siphon are separated from the interior of the bowl by a common wall, thus positioning the siphon flatwise with reference to the rear of the bowl and consequently reducing the necessary projection of the structure in rear of the bowl proper and bringing the final outlet 22 more nearly under the point of inlet of the water and avoiding an unsightly projection of the device into the room, particularly when a tank of any of the ordinary types is positioned in rear thereof.

It has also been found in practice that by reason of the construction and arrangement of the parts indicated the number of elements which must be formed separate from the bowl proper and applied thereto prior to the burning process is minimized as compared with structures for a similar purpose heretofore devised in that said applied parts are limited to the rim, the base, the siphon proper, and the cap 24 by which the siphon is surmounted and which forms the inlet for communication with the flushing rim.

Special attention is called to the fact that a common and single thickness division or partition wall separates the up and down legs of the siphon, just as a common and single wall separates each leg from the interior of the bowl, so that inspection through either leg will enable the examiner to determine whether flaws, blisters, or other imperfections exist and are of such a character as to detract from the efficiency of the product.

Also, it should be noted that when inactive the bowl contains and requires less dead water as a seal than the conventional bowls of the siphon-jet types, the reduction in the necessary quantity being approximately one gallon, and consequently, in addition to this economy, the required force and quantity or volume of water to produce or start the siphonic action are minimized, as compared with the ordinary wash-down bowl and particularly as to the siphon-jet type of apparatus.

In connection with the breaks 20, 21 and 22, it is to be further noted that they are so disposed that the passing water is deflected first toward the front of the bowl, then toward the rear thereof and then again toward the front before passing out the outlet 22. This series of deflections occurs in a plane substantially at right angles to the plane of movement of the water when passing from the up-leg into the down-leg of the siphon. In passing from the up-leg to the down-leg the water travels crosswise with reference to the bowl and in travelling over the breaks its movement is alternately forwardly and rearwardly in the direction of the length of the bowl. This change of direction given to the flushing water enables it to more effectively dislodge any solid contents which may have been caught in the siphon. A continuous flow without any abrupt change of direction such as is herein provided would allow the water to acquire an impetus that would reduce its effectiveness in dislodging all solid matter.

What is claimed is:

1. A closet bowl having means for producing a circulatory or gyratory movement of the water in the bowl, and a siphonic outlet having an opening located in the path of said moving water and at substantially right angles thereto.

2. A closet bowl having means for producing a circulatory or gyratory movement of the water in the bowl, and an outlet having an intake opening located in the path of said moving water and at substantially right angles thereto.

3. A closet bowl having means for producing a circulatory or gyratory movement of water in the bowl, and a siphonic outlet consisting of up and down legs of which both are disposed next to the bowl, the up-leg having an intake opening located in the path of the moving water and at substantially right angles thereto.

FRANKLYN J. WOLFF.